United States Patent
Kuo et al.

(10) Patent No.: US 10,237,463 B2
(45) Date of Patent: Mar. 19, 2019

(54) INTELLIGENT MONITORING SYSTEM AND METHOD

(71) Applicant: Alpha Networks Inc., Hsinchu (TW)

(72) Inventors: Rong-Fa Kuo, Hsinchu (TW); Chia-Hui Chan, Hsinchu (TW); Chung-Wang Lee, Hsinchu (TW)

(73) Assignee: ALPHA NETWORKS INC., Hsinchu (TW)

( * ) Notice: Subject to any disclaimer, the term of this patent is extended or adjusted under 35 U.S.C. 154(b) by 407 days.

(21) Appl. No.: 15/013,214

(22) Filed: Feb. 2, 2016

(65) Prior Publication Data

US 2016/0238691 A1  Aug. 18, 2016

(30) Foreign Application Priority Data

Feb. 16, 2015 (TW) ............... 104105257 A

(51) Int. Cl.
  *G01S 3/786* (2006.01)
  *H04N 5/232* (2006.01)
  *G08B 13/196* (2006.01)
  *G01S 13/00* (2006.01)

(52) U.S. Cl.
  CPC ..... *H04N 5/23203* (2013.01); *G08B 13/1961* (2013.01); *G08B 13/19602* (2013.01); *G01S 13/003* (2013.01)

(58) Field of Classification Search
  CPC ............ G01S 13/003; G08B 13/19602; G08B 13/1961; H04N 5/23203
  USPC .......................................................... 342/1
  See application file for complete search history.

(56) References Cited

U.S. PATENT DOCUMENTS

| 7,271,720 B2* | 9/2007 | Tabe ................. G01N 33/0057 340/506 |
| 8,633,805 B2 | 1/2014 | Tuttle |
| 2002/0014985 A1* | 2/2002 | Wurman ............... G01S 13/003 342/26 R |
| 2004/0233054 A1 | 11/2004 | Neff et al. |
| 2005/0231331 A1 | 10/2005 | Kang |
| 2008/0146944 A1 | 6/2008 | Tao et al. |
| 2008/0165048 A1* | 7/2008 | Shklarsky ............. G01S 13/003 342/59 |

(Continued)

FOREIGN PATENT DOCUMENTS

| CN | 103823217 | 5/2014 |
| TW | 201401217 | 1/2014 |

*Primary Examiner* — Timothy A Brainard
(74) *Attorney, Agent, or Firm* — WPAT, PC

(57) ABSTRACT

In an intelligent monitoring system, a wireless signal processing device transmits a wireless signal toward a first target object in a monitored area, receives a wireless status signal, and generates a monitoring signal corresponding to the first target object according to the wireless status signal. In addition, at least one signal-relaying device receives a back scattering signal, which is reflected from the first target object in response to the wireless signal, transfers the back scattering signal into the wireless status signal, and transmits the wireless status signal to the wireless signal processing device. The signal-relaying device includes a power supply device for supplying power for operations of the signal-relaying device, and the signal-relaying device is disposed in the monitored area between the first target object and the wireless signal processing device.

7 Claims, 6 Drawing Sheets

(56) References Cited

U.S. PATENT DOCUMENTS

| | | | |
|---|---|---|---|
| 2011/0187578 A1* | 8/2011 | Farneth | G01S 13/04 342/27 |
| 2011/0263950 A1 | 10/2011 | Larson et al. | |
| 2013/0060098 A1 | 3/2013 | Thomsen et al. | |
| 2013/0214044 A1* | 8/2013 | Sperduti | G06Q 20/20 235/383 |
| 2014/0070958 A1 | 3/2014 | Foo | |
| 2014/0123763 A1 | 5/2014 | Horng et al. | |
| 2014/0292490 A1* | 10/2014 | Butler | G06K 7/0008 340/10.1 |

* cited by examiner

INTELLIGENT MONITORING SYSTEM AND METHOD

FIELD OF THE INVENTION

The present invention relates to a monitoring system, and more particularly to an intelligent monitoring system. The present invention also relates to an intelligent monitoring method.

BACKGROUND OF THE INVENTION

Current non-contact radar sensing technology is generally based on the Doppler radar sensing principle, and implemented in continuous-wave in direct conversion or Self-Injection Phase-Locked signal for sensing in transmitting and receiving of the radar. In the former way, a continuous wave being a radar source is used for detection. The continuous wave is transmitted to a target object, and a back scattering signal reflected from the target object is analyzed to detect the target object. It is understood that motion of the object will make the back scattering signal create the Doppler frequency/phasing angle modulation. Therefore, to use a direct conversion receiver removes the continuous wave leakage of the transmitter and the carrier of the back scattering signal, and the motion of the object can be measured. In the latter way, the detecting wave of the monitoring system is a continuous wave and is generated by an injection phased-locked oscillator. Likewise, the continuous wave is transmitted to propagate to an object, which causes Doppler frequency/phasing angle modulation of a back scattering signal. The back scattering signal is then propagated back into the injection phase-locked oscillator, and a motion of the object can be measured based on the self-injection locked property of the injection phased-locked oscillator.

Since the distance for sensing an object depends on the intensity of the wireless signal, intensity of the wireless signal needs to be increased for longer distance detection. Generally, stronger intensity of wireless signal needs higher power of electromagnetic wave, and the higher power causes more energy consumption. In addition, an adverse effect might be caused for the detected object.

SUMMARY OF THE INVENTION

Therefore, the present invention provides an intelligent monitoring method which is able to enlarge the monitoring range.

The present invention also provides an intelligent monitoring system, which performs monitoring operations based on an intelligent monitoring method.

An aspect of the present invention relates to an intelligent monitoring system for monitoring at least one target object in a monitored area. The intelligent monitoring system comprises: a wireless signal processing device transmitting a wireless signal toward a first target object in the monitored area, receiving a wireless status signal, and generating a monitoring signal corresponding to the first target object according to the wireless status signal; and at least one signal-relaying device receiving a back scattering signal, which is reflected from the first target object in response to the wireless signal, transferring the back scattering signal into the wireless status signal, and transmitting the wireless status signal to the wireless signal processing device. The signal-relaying device includes a power supply device for supplying power for operations of the signal-relaying device, and the signal-relaying device is disposed in the monitored area between the first target object and the wireless signal processing device.

In an embodiment, the intelligent monitoring system further comprises: a camera device for picking up an image of at least one target object; an image analyzing device electrically coupled to the camera device for receiving the image of the at least one target object from the camera device and generating a reference signal by analyzing status or motion of the at least one target object; and a processor electrically coupled to the image analyzing device and the wireless signal processing device. The processor receives the reference signal from the image analyzing device, and provides the reference signal to the wireless signal processing device, and the wireless signal processing device uses the reference signal as an auxiliary to generate the monitoring signal.

Another aspect of the present invention relates to an intelligent monitoring method for monitoring at least one target object in a monitored area. The intelligent monitoring method is executed by an intelligent monitoring system that comprises a wireless signal processing device and a signal-relaying device. The intelligent monitoring method comprises: transmitting a wireless signal from the wireless signal processing device to a first target object in the monitored area, the wireless signal being reflected by the first target object and transformed into a back scattering signal; receiving the back scattering signal by the signal-relaying device; transmitting a wireless status signal corresponding to the back scattering signal by the signal-relaying device; receiving the wireless status signal by the wireless signal processing device; and generating a monitoring signal corresponding to the first target object by analyzing the wireless status signal by the wireless signal processing device.

In an embodiment, the intelligent monitoring method further comprises: determining a subsequent processing procedure according to the monitoring signal. For example, the subsequent processing procedure is performing a proper operation by the wireless signal processing unit or taking a necessary action by the user.

BRIEF DESCRIPTION OF THE DRAWINGS

The invention will become more readily apparent to those ordinarily skilled in the art after reviewing the following detailed description and accompanying drawings, in which.

DETAILED DESCRIPTION OF PREFERRED EMBODIMENTS

The invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
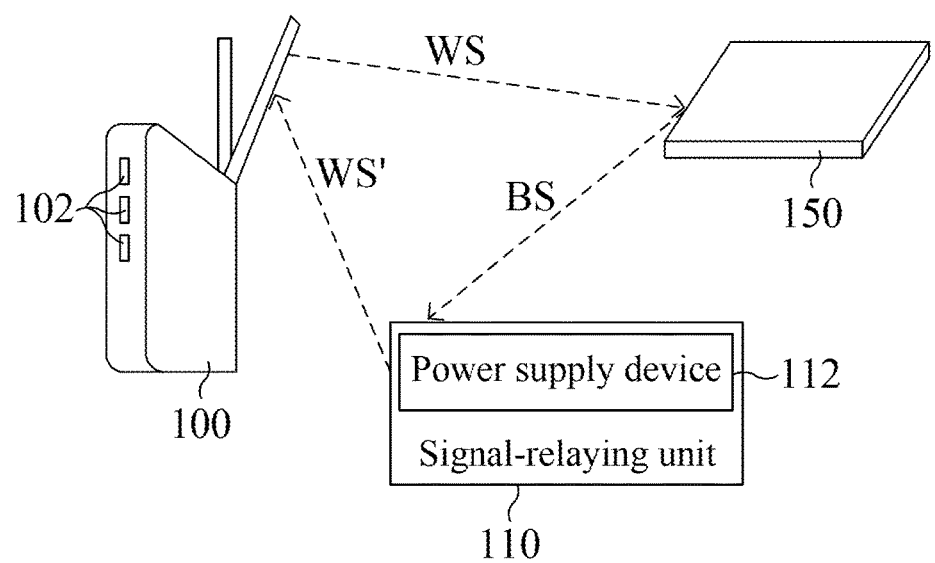
FIG. 1 is a diagram schematically illustrating an intelligent monitoring system according to an embodiment of the present invention.

Please refer to FIG. 1, in which an intelligent monitoring system according to an embodiment of the present invention is schematically illustrated. In this embodiment, the intelligent monitoring system includes a wireless signal processing unit 100 and a signal-relaying unit 110 for monitoring a status of a target object 150.

As shown, the wireless signal processing unit 100 transmits a wireless signal WS to the target object 150, and receives a wireless status signal WS' from the signal-relaying unit 110. When the wireless signal WS transmitted from the wireless signal processing unit 100 reaches the target object 150, backscattering phenomenon occurs so as to generate a back scattering signal BS. The back scattering signal BS is then received by the signal-relaying unit 110. The signal-relaying unit 110 then deals with the received back scattering signal BS according to a predetermined process. The wireless status signal WS', which is generated by the signal-relaying unit 110 after processing the received scattering signal BS, is transmitted out, for example, to the wireless signal processing unit 100. The wireless signal processing unit 100 receives and analyzes the wireless status signal WS' so as to obtain a monitoring signal (not shown) corresponding to the status of the target object 150. The signal-relaying unit 110 used herein may be any suitable device or its equivalent, which can identify and receive a corresponding back scattering signal and deals with the received back scattering signal. For example, the signal-relaying unit 110 may be a code identifying device, e.g. a radio frequency identification (RFID) device, a booster, a repeater, a relay or a combination thereof, and selected according to practical requirement. Hereinafter, a RFID unit is used as an example of the signal-relaying unit 110 for illustrating the present invention.

Once the monitoring signal is realized, the intelligent monitoring system can optionally make adjustment for subsequent monitoring operations. For example, in a case that the contents of the monitoring signal is to be revealed by way of lighting after a subsequent operation, the intelligent monitoring system may control the lighting ways of light units 102 embedded in the wireless signal processing unit 100, e.g. the number, position(s), allocation of targets, and/or sequence of the turned-on light unit(s), according to the contents of the monitoring signal. The contents of the monitoring signal may also be transferred out to an external display or printer to show the contents on the screen or paper. In other embodiments, the intelligent monitoring system may compare the contents of the monitoring signal with one or more thresholds, and make adjustment according to the compared result.

For supporting the operations of the RFID unit 110, a power supply device 112 provides power for the RFID unit 110. The power supply device 112 may be an adapter coupled to a mains supply, a battery or a wireless rechargeable module. The power supply device 112, if being a wireless rechargeable module, can be charged with the wireless signal WS. The RFID unit 110 is generally disposed in an area between the wireless signal processing unit 100 and the target object 150. Preferably, the RFID unit 110 is disposed close to the target object 150, thereby reducing propagation loss of the back scattering signal BS in the scattering path. Meanwhile, the energy required by the wireless signal processing unit 100 for transmitting the wireless signal WS can be reduced. In some cases, the RFID unit 110 could be disposed on the target object 150 or corresponding to the target object 150. In other words, the RFID unit 110 may move with the target object so as to avoid or reduce the Doppler effect caused by other actions of the target object.

Figure 2:
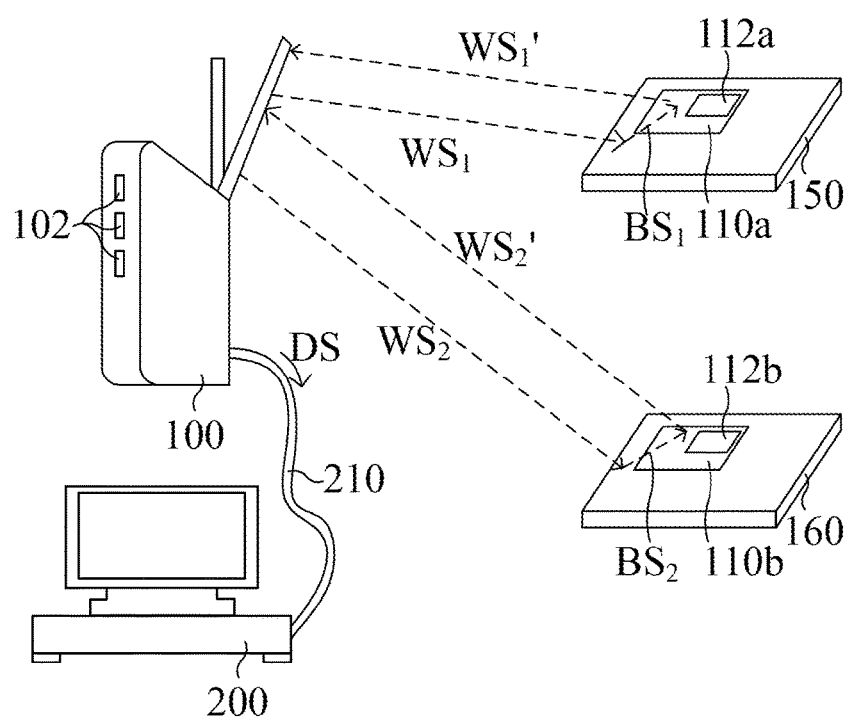
FIG. 2 is a diagram schematically illustrating an intelligent monitoring system according to another embodiment of the present invention.

Please refer to FIG. 2, in which an intelligent monitoring system according to another embodiment of the present invention is schematically illustrated. In this embodiment, the intelligent monitoring system includes a wireless signal processing unit 100 and two radio frequency identification (RFID) units 110a and 110b, wherein the wireless signal processing unit 100 and the RFID unit 110a function for monitoring a status of a target object 150, while the wireless signal processing unit 100 and the RFID unit 110b function for monitoring a status of a target object 160. In this specific embodiment, the RFID units 110a and 110b are attached onto and are moved with the target objects 150 and 160 to avoid or reduce the Doppler effect caused by the relative movement of the target objects to the RFID units 110a and 110b.

The wireless signal processing unit 100 executes the monitoring functions of the target objects 150 and 160 by sequentially transmitting out different wireless signals $WS_1$ and $WS_2$, respectively. In an example, the wireless signals $WS_1$ and $WS_2$ are different in modulation coding, and the RFID units 110a and 110b are designed to deal with the back scattering signals originated from the wireless signal with specific modulation coding. Afterwards, the wireless status signals $WS_1'$ and $WS_2'$ are transmitted from the RFID units 110a and 110b back to the wireless signal processing unit 100, respectively.

Specifically, assume that the wireless signal $WS_1$ is coded with a number 001, and the wireless signal $WS_2$ is coded with a number 002. The back scattering signal $BS_1$ obtained by the reflection of the wireless signal $WS_1$ from the target object 150 thus contains the code 001. Likewise, the back scattering signal $BS_2$ obtained by the reflection of the wireless signal $WS_2$ from the target object 160 thus contains the code 002. Therefore, by setting that the RFID unit 110a only receives signals coded with the number 001 and the RFID unit 110b only receives signals coded with the number 002, only can the back scattering signal $BS_1$ be successfully received by the RFID unit 110a, and analyzed by the RFID unit 110a to generate the wireless status signals $WS_1'$; and only can the back scattering signal $BS_2$ be successfully received by the RFID unit 110b, and analyzed by the RFID unit 110b to generate the wireless status signals $WS_2'$. In this way, the intelligent monitoring system is capable of monitoring a plurality of objects in the same monitored area according to respective wireless status signals.

Furthermore, on the conditions that the RFID unit 110a is set with the number 001 and the RFID unit 110b is set with the number 002, the back scattering signal $BS_1$ generated after the wireless signal WS is reflected by the target object will be successfully received and processed only by the RFID unit 110a set with the number 001. Likewise, the back scattering signal $BS_2$ will be successfully received and processed only by the RFID unit 110b. In this way, the intelligent monitoring system is capable of monitoring a plurality of objects in the same monitored area according to respective wireless status signals.

Although the RFID unit 110a is set to process only the signals coded with the number 001, e.g. the back scattering signal $BS_1$, the RFID unit 110a might receive signals with different coding under a broadcasting condition of the wireless signal processing unit 100. In other words, the RFID unit 110a might also receive the wireless signals $WS_1$ and $WS_2$. Therefore, if the power supply device 112a in the RFID unit 110a is designed as a wireless rechargeable module, the power supply device 112a can be recharged by both the wireless signals $WS_1$ and $WS_2$ so as to provide sufficient power for the operations of the RFID unit 110a. Likewise, the RFID unit 110b might also receive the wireless signals $WS_1$ and $WS_2$ to recharge the power supply device 112b, which is designed as a wireless rechargeable module. Accordingly, the power supply device 112b can provide sufficient power for the operations of the RFID unit 110b.

As described above, the RFID unit identifies and receives a corresponding back scattering signal and processes the received back scattering signal into a wireless status signal, which contains the information reflected from the target object, and then outputted. The signal-processing operation of the RFID unit can be implemented in a variety of ways. In a specific example, the RFID unit functions as a repeater/relay to simply retransmit the back scattering signal as the wireless status signal. In another specific example, the RFID unit functions as a booster to intensify the back scattering signal, and then retransmit the intensified back scattering signal as the wireless status signal. In a further example, the RFID unit demodulates the back scattering signal $BS_1$ to remove its carrier wave, performs alternative modulation of the back scattering signal, and then retransmits the newly modulated wireless status signal.

Furthermore, the operations of the RFID unit 110a depend on the circuitry of the RFID unit 110a and the power supply capability of the power supply device 112a, and are not limited to the above-described ways. The operations of the RFID unit 110b are similar to those of the RFID unit 110a, and are not to be redundantly described herein.

After receiving the wireless status signal $WS_1'$, the wireless signal processing unit 100 analyzes the wireless status signal $WS_1'$ to realize the status information of the target object 150 and then generates a monitoring signal DS revealing any detected motion or status of the target object 150. The analyzing operations conducted by the wireless signal processing unit 100 as well as the carrier-wave filtering operation conducted by the RFID unit 110a or 110b can be implemented with prior art techniques, and will not be described herein. The contents of the monitoring signal DS, as described above, may be revealed by way of lighting, and alternatively, transferred to a display device 200 via a signal line 210 to be displayed.

Figure 3:
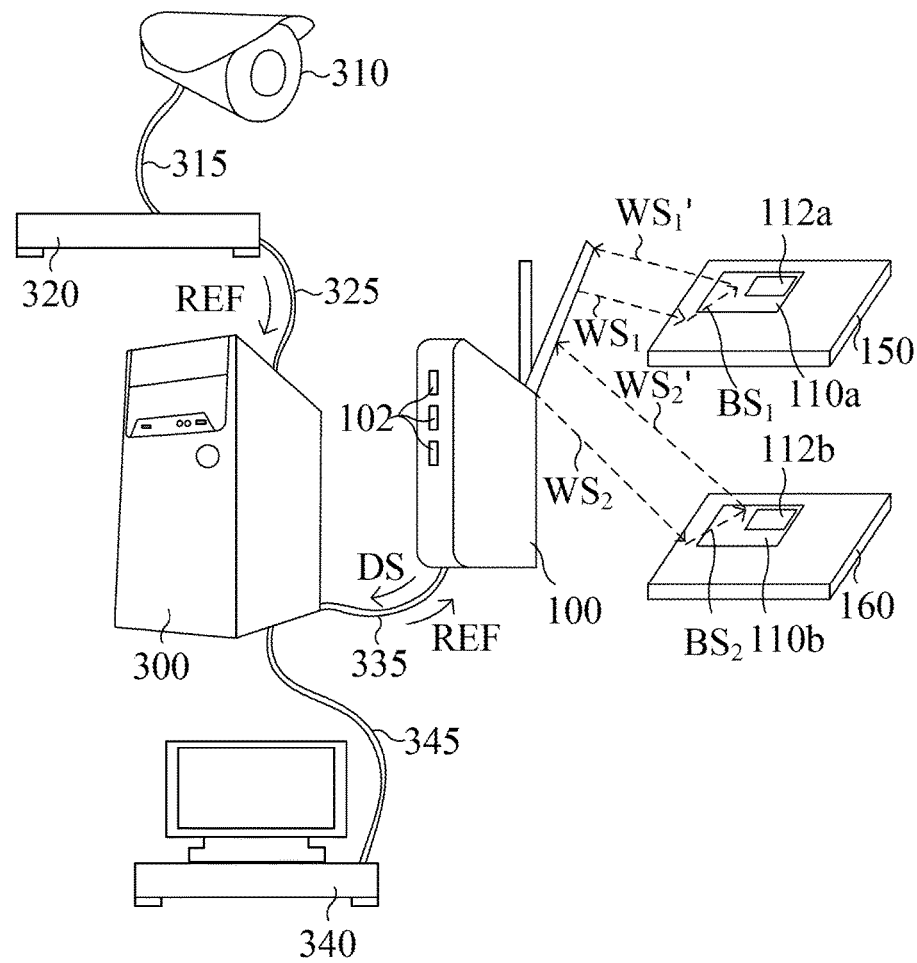
FIG. 3 is a diagram schematically illustrating an intelligent monitoring system according to a further embodiment of the present invention.

Please refer to FIG. 3, in which an intelligent monitoring system according to a further embodiment of the present invention is schematically illustrated. This embodiment of intelligent monitoring system, compared with the intelligent monitoring system illustrated in FIG. 2, additionally includes a processor 300, a camera unit 310 and an image analyzing unit 320. The operations of the wireless signal processing unit 100 and the RFID units 110a and 110b for monitoring the objects 150 and 160 in this embodiment as shown in FIG. 3 are similar to those described with reference to FIG. 2, and will not be redundantly described herein. Instead, the following descriptions will be focused on the parts that are not shown or described hereinbefore.

In the hardware configuration of the intelligent monitoring system, the camera unit 310 is electrically coupled to the image analyzing unit 320 via a signal line 315, and the image analyzing unit 320 is further electrically coupled to the processor 300 via a signal line 325. The processor 335 is electrically coupled to the wireless signal processing unit 100 via a signal line 335 and is further electrically coupled to the display device 320 via a signal line 345.

The camera unit 310 is used for picking up images of the surroundings in a monitored area. For example, it is necessary to monitor both target objects 150 and 160. In an embodiment, the target objects 150 and 160 are both disposed inside the monitored area of the camera unit 310, so the camera unit 310 can pick up images of both the objects 150 and 160 without movement or rotation. In another embodiment, the camera unit 310 is movable and/or rotatable to change monitored area. For example, if only one of the target objects 150 and 160 is initially present in the monitored area while the other one of the target objects 150 and 160 is not, the camera unit 310 may capture the images of the target object present in the current monitored area, and then be moved and/or rotated to change the monitored area to capture the images of the other target object. The images picked up by the camera unit 310 is transferred to the image analyzing unit 320 via the signal line 315. The image analyzing unit 320, after receiving the images from the camera unit 310, analyzes the images to realize the status information, e.g. motion, of the target objects, and generate a reference signal REF.

According to the present invention, different reference signals REF are obtained when different analyzing mean for image analysis are adopted by the image analyzing unit 320. For example, in an ordinary monitored environment, the image analyzing unit 320 analyzes the external status or motion of the target object 150 and/or the target object 160. In other words, when the target object 150 moves or deforms, the image analyzing unit 320 can detect the motion of the target object 150 by analyzing a series of images picked up by the camera unit 310. The reference signal REF indicating the status change or motion of the target object 150 is acquired accordingly. Likewise, when the target object 160 moves or deforms, the image analyzing unit 320 can detect the motion of the target object 160 by analyzing a series of images picked up by the camera unit 310. The reference signal REF indicating the status change or motion of the target object 160 is acquired accordingly.

In a specific example that the intelligent monitoring system is used for monitoring a life system, the objects 150 and 160 could be a human body or an organ or a tissue inside a human body. Therefore, the motion may be an alteration of contour of the human body to respond to the status of the organ or the tissue inside the human body. By using the reference signal containing the status information corresponding to the motion to develop an auxiliary method, whether the human body is in a suitable monitoring condition can be detected and determined, thereby minimizing probability of erroneous interpretation.

In another example, the status information contained in the reference signal may correspond to internal status of the target object. In more detail, the image analyzing unit 320 detects an internal status of the object 150 and/or the object 160. The image analyzing unit 320 would realize the internal status by comparing and analyzing the sequentially picked-up images, and generates a reference signal containing the status information corresponding to the internal status. In the specific example that the intelligent monitoring system is used for monitoring a life system, the internal status may be a condition of the human body, or the organ or the tissue inside the human body. For example, a reference heartbeat rate or a reference respiratory rate may be used as or constitute a part of the reference signal and provided as an auxiliary for subsequent analysis.

Since the hemoglobin contained in the blood of the human body is able to absorb green rays, respective brightness changes of the three primitive colors, i.e. red, green and blue, the blood flow condition can be shown in the green-ray absorption images picked up by the camera unit 310. By outputting the data corresponding to the brightness changes to the image analyzing unit 320 to be analyzed, the blood flow condition of the human body can be realized. Furthermore, according to the blood flow condition, a reference heartbeat rate of the human body can be estimated, and used as or constitute a part of the reference signal.

The reference signal REF is then transmitted from the image analyzing unit 320 to the processor 300 via the signal line 325. The processor 300 may stores the reference signal REF, display the contents of the reference signal REF, or provide the contents of the reference signal REF to the wireless signal processing unit 100 via the signal line 335. In this embodiment, the contents of the reference signal REF are sent to the wireless signal processing unit 100 via the signal line 335. The wireless signal processing unit 100 then operates signal analysis with the reference signal REF used as an auxiliary. With the reference signal, the wireless signal processing unit 100 works more reliably for monitoring real-time conditions of the human body, e.g. real-time heartbeat rate, compared with the prior art.

Specifically, by incorporating the position information of the target objects 150 and/or 160 into the reference signal REF, the wireless signal processing unit 100 can transmit the wireless signals $WS_1$ and/or $WS_2$ more accurately and avoid tracing wrong objects.

In the example that the intelligent monitoring system is used for monitoring a life system, the received wireless status signals $WS_1'$ and $WS_2'$ need to be demodulated, and the system noises should be filtered off by a low pass or band pass filter in order to obtain accurate real-time heartbeat rate or real-time respiration rate. It is understood that the modulation and filtration processes need a large amount of calculation and comparison. By using the heartbeat rate or respiratory rate contained in the reference signal as an initial value of the signal for the low pass filtering, the duration of time spent on signal processing can be reduced. In other words, the respiration rate (hereinafter, real-time respiration rate) and the heartbeat rate (hereinafter, real-time heartbeat rate) can be obtained quickly and accurately. Since the monitoring signal obtained by the intelligent monitoring system would correlate to the above-described reference data, the use of the reference signal as an auxiliary would be helpful for the wireless signal processing unit 100 to analyze the scattering wireless signal. The monitoring signal DS can thus be obtained quickly and accurately.

As understood from the above descriptions, the image information provided by the camera unit 310 and the reference signal REF provided by the image analyzing unit 320 are just for reference. Therefore, the hardware requirement of the camera unit 310 and the image analyzing unit 320 is not necessarily in high accuracy. Actually, common and inexpensive ones are enough for the purposes of executing the present invention. Sometimes when the motion or status of the target object cannot be successfully detected, for example due to sudden disappearance of the target object or malfunctions of the monitoring system, the images obtained by the camera unit 310 may be used, without the scattering wireless signal, for continuously monitoring of on-site situations. Even if the monitoring effect might be rough, the monitoring of on-site situations with the camera unit 310 is still helpful to avoid the interruption or the loss of important and urgent information, e.g. cardiac arrest.

In other examples, the image analyzing unit 320 and the processor 300 are formed as an integral device, and/or the camera unit 310 the image analyzing unit 320 and the processor 300 are formed as an integral device. If proper, the wireless signal processing unit 100, the camera unit 310, the image analyzing unit 320, and the processor 300 are form as an integral device may also be integrated in a multifunctional camera system that is capable of recording images or video, analyzing images and processing wireless signals. In addition to the above-mentioned hardware units or devices, the intelligent monitoring system according to the present invention may further include means for moving and/or rotating the camera device 310 and/or the wireless signal processing unit 100 to dynamically adjust the orientation and/or facing direction, thereby enlarging the monitored area.

Figure 4A:
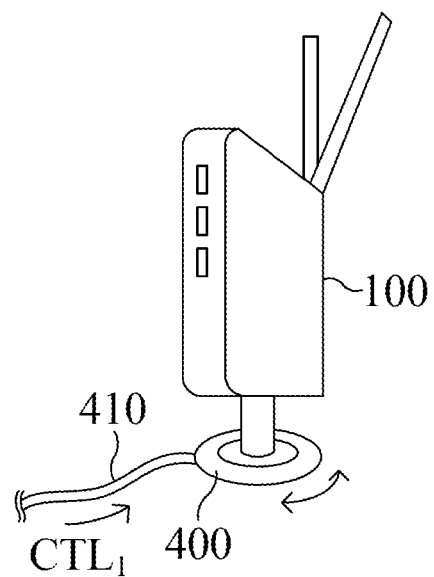
FIG. 4A is a prospective view schematically exemplifying the appearance of a wireless signal processing unit adapted to be used in an intelligent monitoring system according to the present invention.

Now, a wireless signal processing unit adapted to be used in any of the above embodiments is exemplified herein and illustrated with reference to FIG. 4A. In this example, the wireless signal processing unit 100 is electrically coupled to a driving unit 400, and the driving unit 400 is further electrically coupled to the processor 300 as shown in FIG. 3 or another type of control device via a signal line 410. Therefore, the position and/or orientation of the wireless signal processing unit 100 can be properly adjusted, e.g. rotated and/or moved or any other suitable way, by the driving unit 400 according to a control signal $CTL_1$ outputted by the processor 300 or the another type of control device. It is to be noted that although the driving unit 400 shown in the figure conducts a rotating action, as indicated by a double headed arrow, the driving unit 400 may be designed to conduct additional or any other suitable driving action.

Figure 4B:
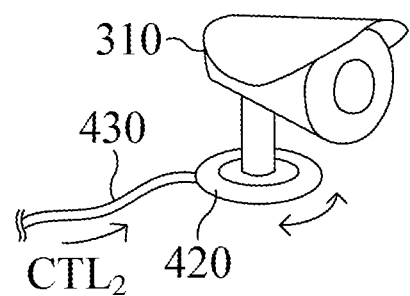
FIG. 4B is a prospective view schematically exemplifying the appearance of a camera unit adapted to be used in an intelligent monitoring system according to the present invention.

FIG. 4B schematically illustrates an example of the camera unit 310. The camera unit 310 is electrically coupled to a driving unit 420, and the driving unit 420 is further electrically coupled to the processor 300 as shown in FIG. 3 or another type of control device via a signal line 430. Therefore, the position and/or orientation of the camera unit 310 can be properly adjusted, e.g. rotated and/or moved or any other suitable way, by the driving unit 420 according to a control signal $CTL_2$ outputted by the processor 300 or the another type of control device. It is to be noted that although the driving unit 420 shown in the figure conducts a rotating action, as indicated by a double headed arrow, the driving unit 420 may be designed to conduct additional or any other suitable driving action.

The control signals $CTL_1$ and $CTL_2$ for adjusting the position/orientation of the wireless signal processing unit 100 and the position/orientation of the camera unit 310, respectively, can be generated by the processor 300 or another type of control device in various ways. For example, the control signal $CTL_1$ can be manually set. In other words, the processor 300 or the another type of control device converts the user's command into the control signal $CTL_1$, which then run in to the driving unit 400. Then the driving unit 400 drives the automatic movement or rotation of the wireless signal processing unit 100 to a specific position or orientation according to the contents of the control signal $CTL_1$. Likewise, the processor 300 converts the user's command into the control signal $CTL_2$, which then run in to the driving unit 420. Then the driving unit 420 drives the automatic movement or rotation of the camera unit 310 to a specific position or orientation according to the contents of the control signal $CTL_2$. In another example, the processor 300 or the another type of control device generates and outputs the control signals $CTL_1$ and/or $CTL_2$ to the driving unit 400 and/or 420 to drive cyclic movement and/or rotation of the wireless signal processing unit 100 and/or the camera unit 310 according to default programs. In a further example, the wireless signal processing unit 100 is designed to capture one or more moving objects. Whenever the camera unit 310 detects a moving object, the associated information will be transferred to the processor 300 through the reference signal REF, and the processor 300 generates the corresponding control signal $CTL_1$ to the driving unit 400, thereby moving or rotating the wireless signal processing unit 100 to a default position or orientation.

When there are more than one object to be monitored, they can be monitored in a time-division multiplexing way. By installing the cameral unit 310 and the wireless signal processing unit 100 on the same carrier (not shown), and automatically moving and/or rotating the carrier to have the cameral unit 310 and the wireless signal processing unit 100 aim at the plural objects in turn, the objects can be monitored at different time slots. The movement and/or rotation of the carrier may be conducted by the driving unit 400 and/or the driving unit 420 at constant or specifically designed intervals. Furthermore, a plurality of camera units 310 may be provided for picking up images of different target objects, and/or the wireless signal processing unit 100 may be equipped with a plurality of smart high directional antennas differently allocated and/or oriented for detecting respective target objects. The driving unit 420 and/or the driving unit 400, in this example, actuates the camera units 310 and/or the intelligent highly directional antennas of the wireless signal processing unit 100 in response to the control signal $CTL_2$ and/or the control signal $CTL_1$. For example, the plurality of camera units 310 may be actuated by the driving unit 420 at different time points in response to the control signal $CTL_2$, thereby presenting the similar effect of moving or rotating the single camera unit 310 as described above. Likewise, the plurality of smart high directional antennas may be actuated at different time points in response to the control signal $CTL_1$, thereby presenting the similar effect of moving or rotating the wireless signal processing unit 100 as described above.

The aforementioned wireless signal WS, for example, is a radio continuous wave signal or a radio modulation signal (FSK or PM).

For readily providing monitoring information for user's reference, an internet protocol (IP) camera may be used as the camera unit 310. The user may also read monitored information at a remote end by way of media access control (MAC) of the processor 300. Furthermore, the control signals $CTL_1$ and $CTL_2$ may be generated by the processor 300 to control movement or rotation of the camera unit 310 by way of remote control.

Furthermore, some complicated calculations that are supposed to be executed by the image analyzing unit or wireless signal processing unit, e.g. image analysis, signal filtration, etc., can be alternatively executed by the processor 300. As such, the hardware architecture of the wireless signal processing unit 100 can be simplified, and the image analyzing unit 320 can be omitted.

Figure 5:
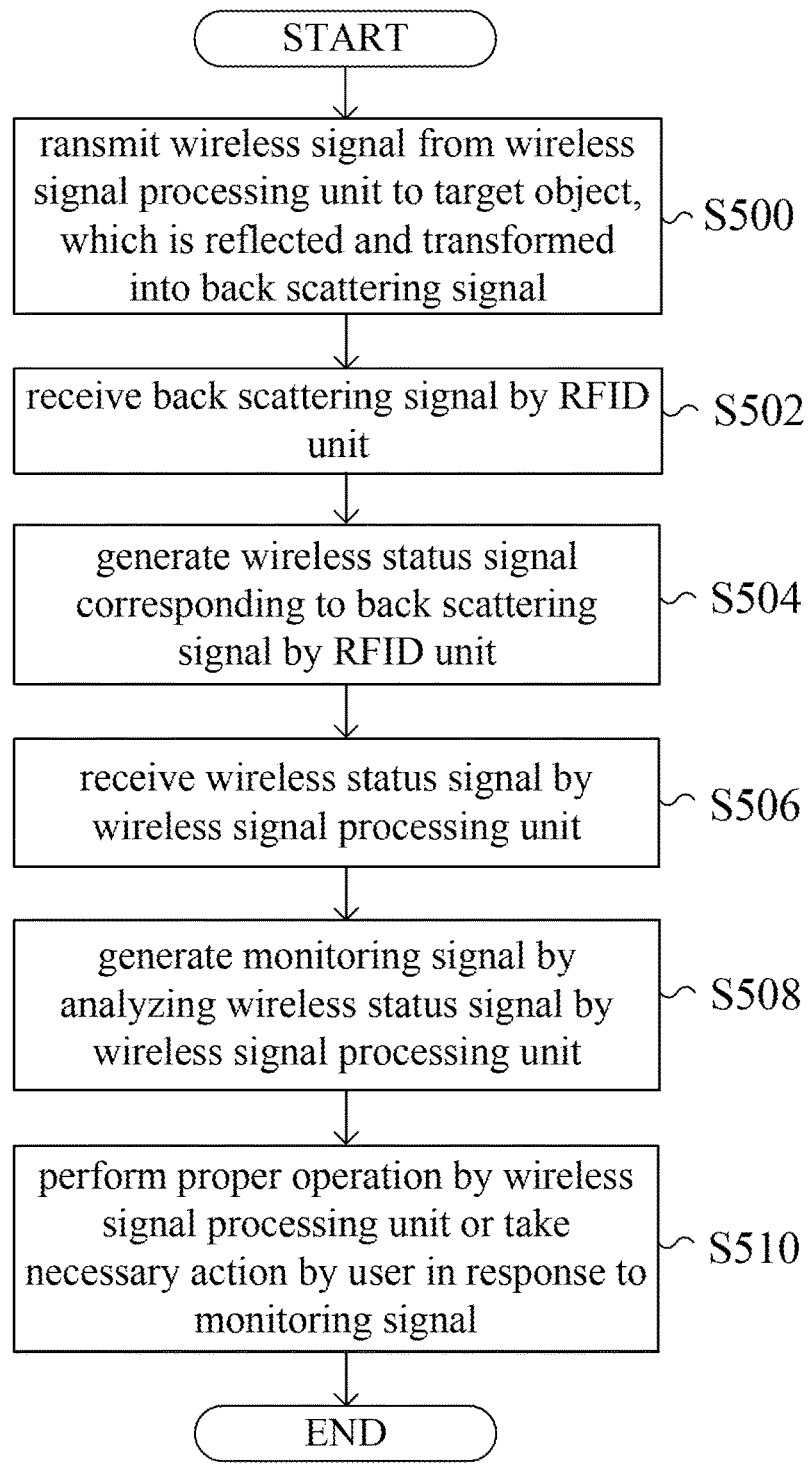
FIG. 5 is a flowchart schematically illustrating an intelligent monitoring method according to an embodiment of the present invention.

FIG. 5 is a flowchart schematically illustrating an intelligent monitoring method according to an embodiment of the present invention. This embodiment of method can be executed with any of the above-described embodiments of intelligent monitoring system or any other suitable or equivalent means. In the beginning of the monitoring process, the above-described wireless signal processing unit or any other suitable wireless signal generating unit transmits a wireless signal to a target object, and the wireless signal is reflected from the target object and transformed into a back scattering signal (Step S500). The above-described RFID unit or any other suitable identifying device receives the back scattering signal corresponding to the target object (Step S502). As mentioned above, when a plurality of target objects are monitored, different modulation codes may be imparted to the wireless signals transmitted to different target objects so that different RFID units can identify and correctly receive specific back scattering signals.

After receiving the back scattering signal in Step S502, the RFID unit generates a wireless status signal relevant to the received back scattering signal in Step S504. As mentioned above, the back scattering signal can be processed into the wireless status signal simply by amplification. Alternatively, the amplification of the back scattering signal may follow the demodulation of the carrier wave of the back scattering signal, thereby generating a new wireless signal, i.e. the wireless status signal. Of course, any other suitable ways that could propagate the signal may be used to generate the new wireless signal, i.e. the wireless status signal.

The wireless status signal transmitted by the RFID unit in Step S504 is then received by the wireless signal processing unit in Step S506. After receiving the wireless status signal, either the wireless signal processing unit or the processor 300 generates a monitoring signal based on the information carried by the wireless status signal (Step S508). Afterwards, a proper operation of the intelligent monitoring system could be performed or a necessary action of the user could be taken in response to the monitoring signal (Step S510).

Figure 6:
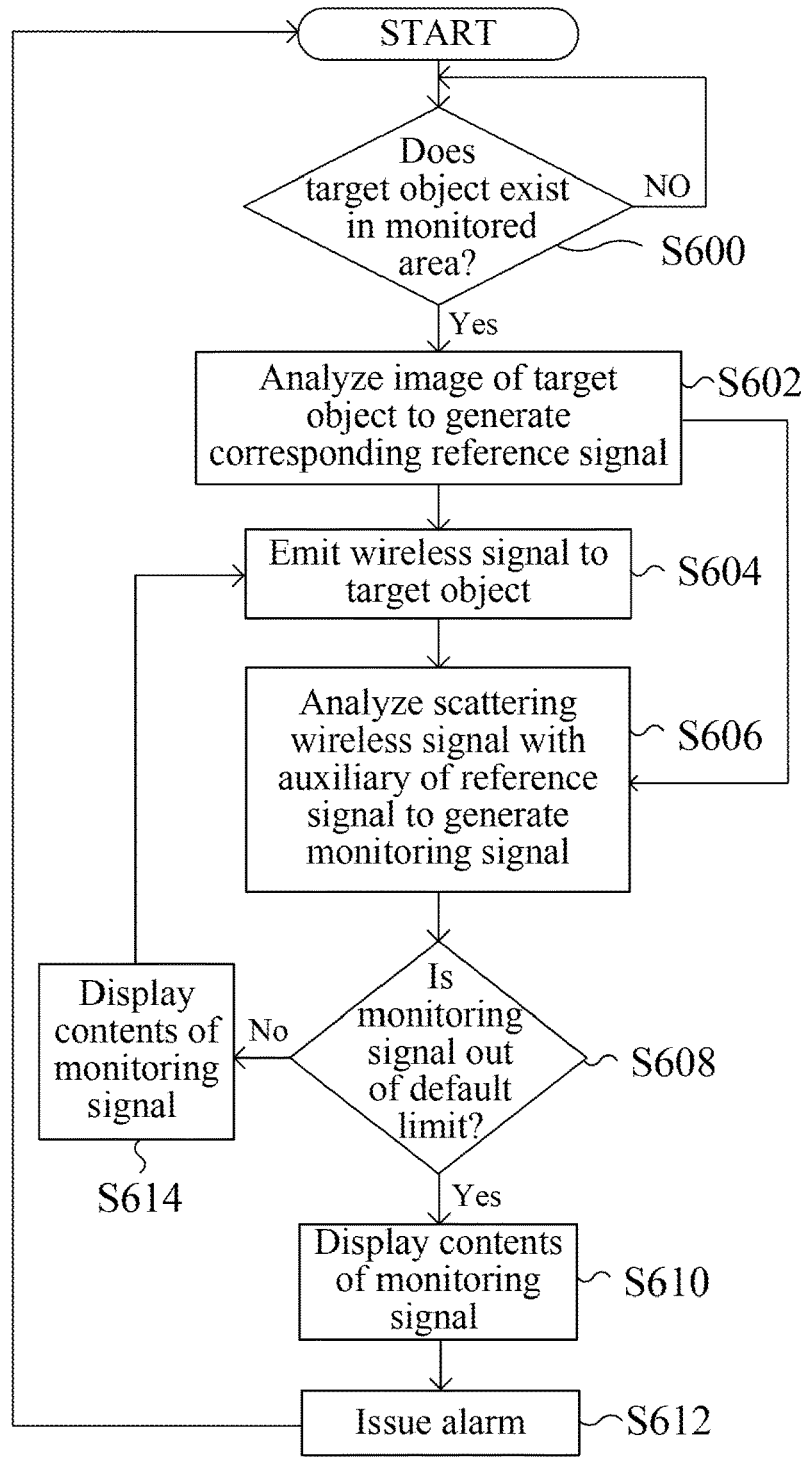
FIG. 6 is a flowchart schematically illustrating an intelligent monitoring method according to another embodiment of the present invention.

FIG. 6 is a flowchart schematically illustrating an intelligent monitoring method according to another embodiment of the present invention. In this embodiment of method, the monitoring signal is generated with the use of a reference signal as an auxiliary. First of all, whether there is a target object existing in the monitored area or not is detected (Step S600). For example, the detection to identify whether a target object exists or not can be analyzed according to the images picked up by the camera unit 310 or according to the scattering wireless signal received by the wireless signal processing unit 100. If no target object is detected, keep the detecting step S600 until the target object to be monitored appears. Once the target object is detected in Step S600, proceed to Step S602, in which the motion or internal status of the target object is analyzed to generate a corresponding reference signal. In some specific cases that the monitoring flow starts from the presence of the target object in the monitored area, the procedure of determining whether there is a target object existing in the monitored area (Step S600) at the beginning is not essential.

As described above, the contents of the reference signal may be different under different environments. For example, in an ordinary monitoring condition, an external location change of the target object may be one of the criteria used for obtaining the status information. The reference signal may simply contain either the location information or the motion information of the target object. In another example that the target object is the face of a human body, an internal color variation on the human face may be one of the criteria used for obtaining the status information. The external color variation, for example, indicates a blood motion. In other words, the motion of the target object can be detected as the reference signal by the surface color variation. In addition to the location or motion information, the reference signal in this case is also used for assisting the detection of a heartbeat rate of the human body.

After the reference signal is generated in Step S602, the flow proceeds to Step S604 to transmit a wireless signal toward the target object, and generate a wireless status signal in response to a back scattering signal reflected by the target object. The steps S500~S506 illustrated as above with reference to FIG. 5 can be used as an implementation of the Step S604, which will not be redundantly described herein. Meanwhile, in Step S606, the reference signal previously or synchronously generated is provided as an auxiliary for analyzing the wireless status signal. According to the analysis result, a monitoring signal, which reveals a motion or status of the target object, is obtained. The monitoring signal may show any rough or fine variation of the target object. For example, the monitoring signal may be used for monitoring the real-time heartbeat rate or real-time respiration rate. In this embodiment, the reference signal is used as an auxiliary. In other embodiments, the reference signal may also be directly used for detecting whether the target object exists in the monitored area or not.

Afterwards in Step S608, whether the monitoring signal obtained in Step S606 is beyond a default limit is determined. When the motion or status of the target object is detected as being within the default limit, it is determined as being on a normal condition. If the monitoring signal is out of the default limit, it is determined that an abnormal condition occurs. For example, all the objects in the monitored area are supposed to be still, i.e. zero speed, and however, a movement of an object is sensed, i.e. higher than zero speed, even though the object further exhibits breathing and/or heart-beating phenomena. In another example, the movement of the object is determined when an instantaneous frequency of motion is out of a default limit for defining "still". For example, assume the default limit for defining "still" is 20 beats per minute, but the detected beat rate is more than 20 per minute suddenly. In a further example, if no breath or no heartbeat is detected on a monitored human body, or in contrast, over high breath or heartbeat rate is detected, the monitoring signal is also determined to be out of the default limit. Under one of those circumstances, the contents of the monitoring signal are displayed (Step S610), and preferably, an alarm is issued (Step S612). The flow then starts again from Step S600 for recheck. If it is determined in Step S608 that the monitoring signal is within a default limit, the contents of the monitoring signal are displayed (Step S614), and the flow goes back to Step S604 for next analysis.

In the above-described flow, the steps are executed to monitor a single target object or the same one of a plurality of objects. When plural objects are to be monitored, the flow can be repetitively executed for monitoring each of the plural objects, and the switching is conducted after one or more runs of the steps have been executed for a currently monitored object. Specifically, the switching between different objects can be readily and accurately performed by giving different modulation codes to different RFID units and different wireless signals.

Furthermore, the movement or rotation of the camera unit and/or the wireless processing unit operating by way of a beaming forming technology, as well as the installation of multiple camera units and/or directional antennas, may also be incorporated into the above-described flow, in which a reference signal is used as an auxiliary. Since the incorporation can be easily conducted by those skilled in the art, it is to be redundantly described herein.

According to the present invention, an RFID unit is used as a relay station of a wireless signal so that the monitoring distance can be extended without increasing the intensity of the wireless signal. By giving different modulation codes to different wireless signals transmitted to different target objects, different wireless status signals transmitted from different target objects back to the processing device can be distinctly identified. As such, the intelligent monitoring system and method are beneficial to the monitoring field.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An intelligent monitoring method for monitoring at least one target object in a monitored area, the intelligent monitoring method being executed by an intelligent monitoring system that comprises a wireless signal processing device and a signal-relaying device, and comprising:
   transmitting a wireless signal from the wireless signal processing device to a first target object in the monitored area, the wireless signal being reflected by the first target object and transformed into a back scattering signal;
   receiving the back scattering signal by the signal-relaying device;
   transmitting a wireless status signal corresponding to the back scattering signal by the signal-relaying device;
   receiving the wireless status signal by the wireless signal processing device;
   generating a monitoring signal corresponding to the first target object by analyzing the wireless status signal by the wireless signal processing device;
   using a camera device to detect whether any of the at least one target object is present in the monitored area; and
   generating a reference signal as an auxiliary for generating the monitoring signal by analyzing a status or a motion of detected target object.

2. The intelligent monitoring method according to claim 1 wherein the wireless signal processing device analyzes the wireless status signal with the reference signal used as the auxiliary, and generates the monitoring signal corresponding to the wireless status signal.

3. The intelligent monitoring method according to claim 1, further comprising:
   transmitting another wireless signal from the wireless signal processing device to a second target object in the monitored area, the another wireless signal being reflected by the second target object and transformed into another back scattering signal; and
   receiving the another back scattering signal by another signal-relaying device,
   wherein the wireless signal and the another wireless signal are transmitted to the first target object and the second target object sequentially.

4. The intelligent monitoring method according to claim 1, wherein the back scattering signal is amplified and outputted as the wireless status signal.

5. The intelligent monitoring method according to claim 1, wherein the back scattering signal is processed to remove a carrier wave thereof, amplified to increase intensity thereof, and then outputted as the wireless status signal.

6. The intelligent monitoring method according to claim 1, further comprising:
   determining a subsequent processing procedure according to the monitoring signal.

7. An intelligent monitoring system for monitoring at least one target object in a monitored area, comprising:
   a wireless signal processing device transmitting a wireless signal toward the monitored area to reach a first target object, receiving a wireless status signal, and generating a monitoring signal corresponding to the first target object according to the wireless status signal;
   at least one signal-relaying device receiving a back scattering signal, which is reflected from the first target object in response to the wireless signal, transferring the back scattering signal into the wireless status signal, and transmitting the wireless status signal to the wireless signal processing device, wherein the signal-relaying device includes a power supply device for supplying power for operations of the signal-relaying device, and the signal-relaying device is disposed in the monitored area between the first target object and the wireless signal processing device;
   a camera device for picking up an image of at least one target object;
   an image analyzing device electrically coupled to the camera device for receiving the image of the at least one target object from the camera device and generating a reference signal by analyzing status or motion of the at least one target object; and
   a processor electrically coupled to the image analyzing device and the wireless signal processing device,
   wherein the processor receives the reference signal from the image analyzing device, and provides the reference signal to the wireless signal processing device, and the wireless signal processing device uses the reference signal as an auxiliary to generate the monitoring signal.

* * * * *